M. F. WILLIAMS.
DUST SEPARATOR.
APPLICATION FILED FEB. 3, 1916.
1,212,596.
Patented Jan. 16, 1917.
2 SHEETS—SHEET 1.
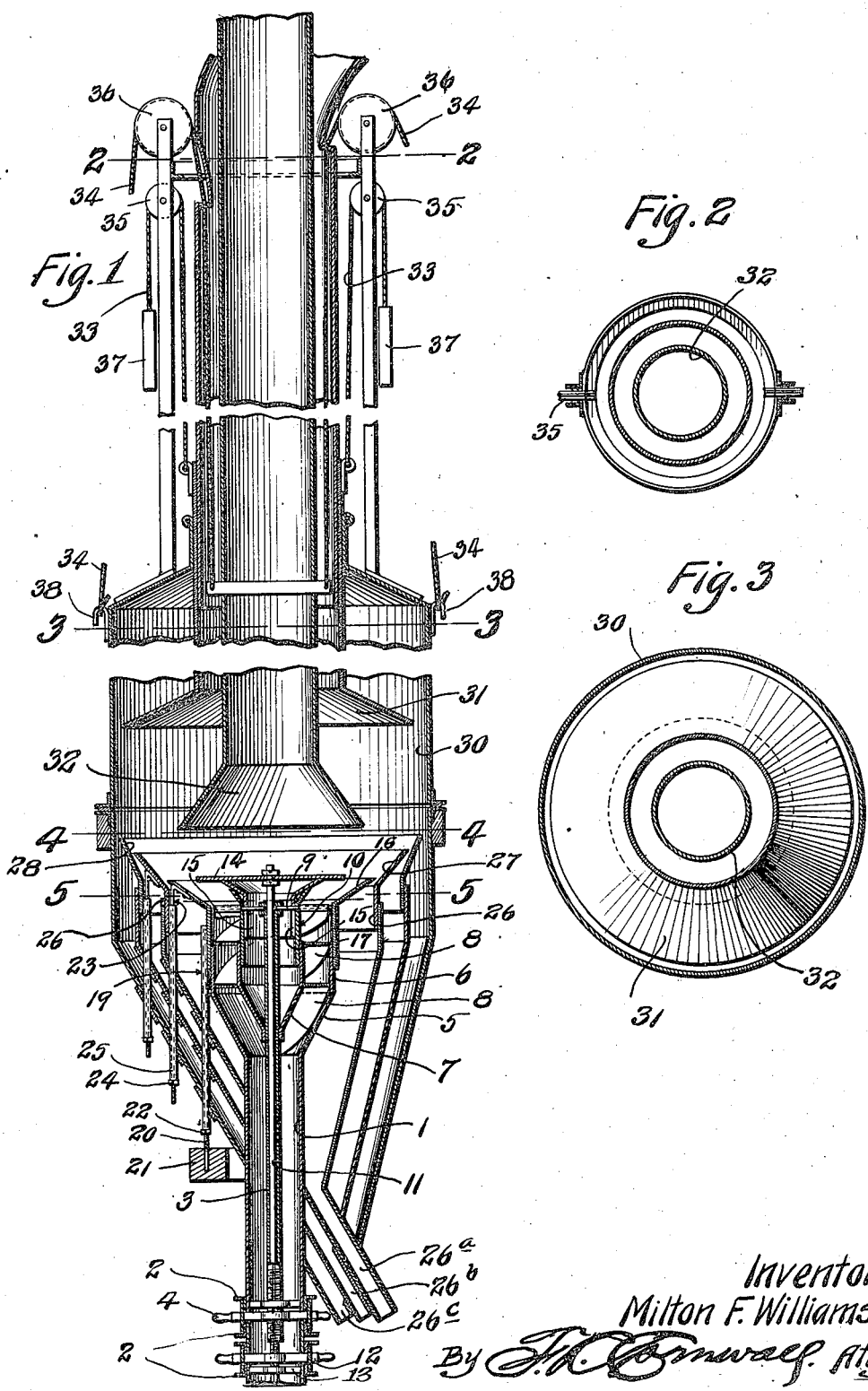
Inventor
Milton F. Williams
By T. J. Cornwall, Atty.

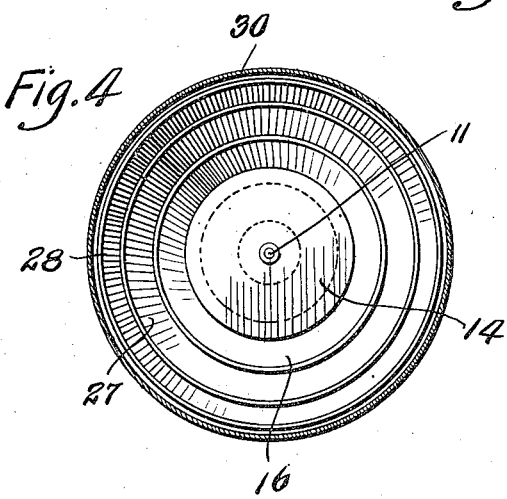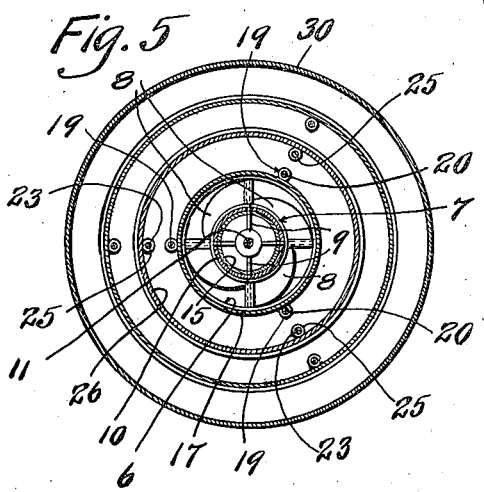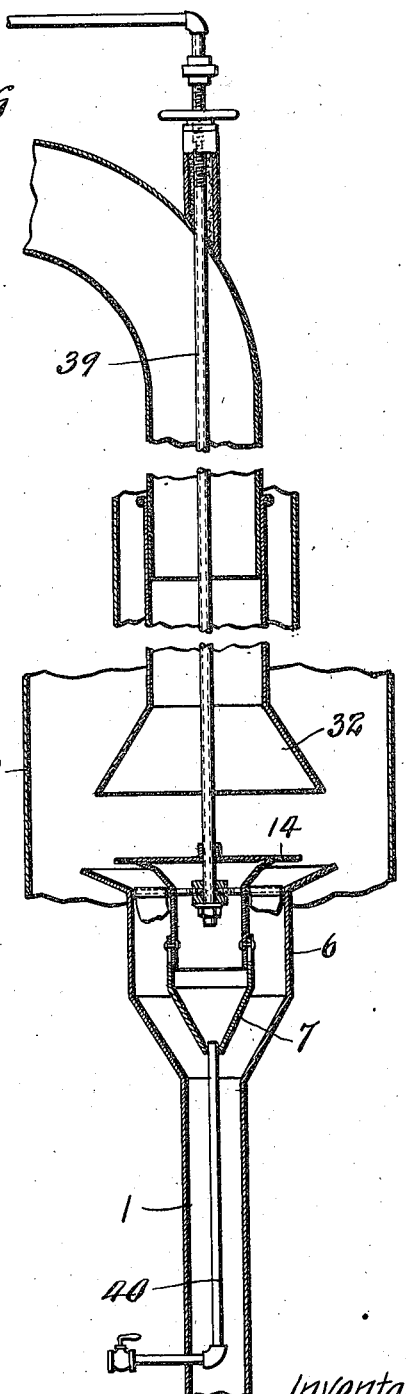

UNITED STATES PATENT OFFICE.

MILTON F. WILLIAMS, OF ST. LOUIS, MISSOURI, ASSIGNOR TO WILLIAMS PATENT CRUSHER AND PULVERIZER COMPANY, OF ST. LOUIS, MISSOURI, A CORPORATION OF MISSOURI.

DUST-SEPARATOR.

1,212,596.  Specification of Letters Patent.  Patented Jan. 16, 1917.

Application filed February 3, 1916.  Serial No. 75,966.

*To all whom it may concern:*

Be it known that I, MILTON F. WILLIAMS, a citizen of the United States, residing at the city of St. Louis, State of Missouri, have invented a certain new and useful Improvement in Dust-Separators, of which the following is a full, clear, and exact description, such as will enable others skilled in the art to which it appertains to make and use the same, reference being had to the accompanying drawings, forming part of this specification, in which—

Figure 1 is a vertical sectional view. Fig. 2 is a cross sectional view on line 2—2. Fig. 3 is a cross sectional view on line 3—3. Fig. 4 is a cross sectional view on line 4—4 of Fig. 1. Fig. 5 is a cross sectional view on line 5—5 of Fig. 1. Fig. 6 is a modified form of the separator.

This invention relates to a new and useful improvement in dust separators.

My present improvement relates more particularly to means of adjusting the several parts whereby the particles of material may be graded.

In the drawings 1 indicates the inlet pipe which is secured to some suitable framework such as represented by angle irons 2.

3 is a pipe arranged centrally within the pipe 1 and having its lower end threaded to coöperate with revoluble nut 4, said nut being capable of rotation so that through the threaded engagement with the pipe 3 it will cause said pipe to be raised or lowered as desired.

The upper end of pipe 1 is flared as at 5, the extreme upper portion of this inlet pipe being cylindrical as at 6. In the flaring portion there is a conical shaped core 7, the upper portion of which is cylindrical and attached to this conical shaped portion and cylindrical upper extension are spiral blades 8. The upper ends of these blades 8 continue above the cylindrical portion of the core but such continuations are flexible, the extreme upper ends of the blades being connected to cross rods 9 (see Fig. 5). These cross rods 9 are mounted in a sleeve 10 having telescopic engagement with the cylindrical portion of the core 7 so that when the threaded pipe 3 is raised or lowered, the upper extremities of the blades 8 are flexed or warped so as to enlarge or contract the openings through which the dust laden air passes in emanating from said blades. The threaded pipe 3, before referred to, contains a rod 11, the lower end of which extends below the pipe 3 and coöperates with a revoluble nut 12 arranged on its lower end whereby upon the rotation of the nut 12, the rod 3 can be raised or lowered. There is a spider 13 arranged adjacent the nut 12 and through which the rod 11 passes. This spider is provided with a key for coöperating with a key-way in the rod 11 to prevent its rotation, but permit its vertical movement when the nut 12 is rotating. The upper end of rod 11 carries a spreading plate 14 which is provided with a depending circular flange 15 fitting within the cylinder 10 whereby the spreading plate may be guided in its vertical adjustment. The dust laden air entering through the inlet pipe and being forced upwardly under pressure is given a whirling motion by the helically arranged blades 8 whose upper ends, as stated before, are capable of being warped so as to permit the dust laden air issuing therefrom to be directed horizontally in different angular degrees. The adjustment of the spreading plate 14 also helps to confine the air and send it outwardly in a horizontal sheet, depending upon the proximity of the spreading plate to the upper ends of the helical blades. As the dust laden air passes outwardly into the separating chamber the particles of dust are thrown against circular flanges of gradually increasing angularity, means being provided to space these flanges apart at desired distances whereby the separated dust may be graded.

16 is an inclined circular flange arranged on the upper end of a cylinder 17. On this cylinder 17 are three pipes 19, one of which is shown in Fig. 1, said pipes being arranged equidistantly around the cylinder and each one forming a housing for a threaded rod 20, the lower end of which is seated in a framework 21 and on which rod is a nut 22. By turning these nuts upon the rods, the cylinder and its angular flange may be adjusted upwardly or downwardly. The angular flange referred to carries three rods 23 equidistantly disposed therearound whose lower ends are threaded and provided with nuts 24. Pipes 25 connected to a cylinder 26 communicating with a discharge spout 26ª enable the adjustment of this cylinder vertically relative to the first mentioned cylinder. The cylinder 26 is provided with an angular flange 27 at its upper end but whose angularity is greater than that of the angular flange 16, first referred to, the theory being that the heavier particles, forced over the edge of the first mentioned flange of slighter angularity, will have greater difficulty in climbing the second angular flange of greater angularity and hence will fall over the edge of the first flange. So likewise there is a third angular flange 28 having its cylinder with pipes and adjusting rods, the latter being connected to the second angular flange, the third angular flange being of greater angularity than the second. These flanges, cylinders, and means of adjustment may be repeated as necessity for their multiplication demands. It will be noted that the adjustment of the first mentioned cylinder and its angular flange will carry with it the other angular flanges and cylinders, but this is of no consequence as the flanges are capable of being adjusted relative to each other. The heavy particles of material dropping over the edges of the flanges of varying angularity are to a greater or lesser extent graded and are discharged through spouts 26ª, 26ᵇ, and 26ᶜ, that passing through the latter being the finest, and in some particulars this is highly desirable; but it is also desired to separate the finer particles or dust which in some materials constitute the finished product. To do this I arrange within the expansion chamber 30 two adjustable discharge pipes 31 and 32, each having a flaring lower end, the lower end of the former practically covering the entire expansion of the chamber. Each discharge pipe is made adjustable vertically within the expansion chamber by means of ropes 33 and 34 connected thereto which pass over pulleys 35 and 36 and which at their opposite ends may be connected to counterbalancing weights 37 or be tied to hooks 38 on the walls of the separating chamber or some other convenient place.

In Fig. 6 I have shown a modification of my invention in which the spreading plate is movable with the flexing ends of the spiral blades by means of a suspended steam pipe 39 which admits steam to the interior of the core on which the spiral blades are mounted. This steam pipe is indicated at 39 and a drip pipe 40 leads from the bottom of the core. The purpose of this construction is to heat the dust laden air as it enters the expansion chamber, and in some products, if it is desired to dampen the particles of dust as they are thrown into the expansion chamber, the walls of the core may be perforated.

I claim:

1. A dust separator comprising an inlet pipe having helically arranged blades at its inner end in combination with means for flexing or warping said blades so as to regulate the angularity of the entering blasts of dust laden air.

2. A dust separator comprising a separating chamber, and an inlet pipe leading thereinto, a series of helically arranged blades in the inlet pipe, the lower ends of which are fixed and whose upper ends are movable, said upper ends being connected to an adjustable part whereby the angularity of the discharging blasts of dust laden air may be regulated.

3. A dust separator comprising a separating chamber, an inlet pipe leading thereinto, spiral blades arranged in the inner end of said pipe, means for adjusting the upper ends of said blades, a spreading plate located immediately above the upper ends of said blades, and means for adjusting said spreading plate independent of any adjustment of said blades.

4. A dust separator comprising a separating chamber, an inlet pipe leading thereinto, means located in the inner end of said inlet pipe for imparting a whirling motion to the dust laden air as it enters said chamber, and a series of separating flanges of gradually increasing angularity from which the dust laden air is impelled 5. A dust separator comprising a separating chamber, an inlet pipe leading thereinto, means located in the inner end of said inlet pipe for imparting a whirling motion to the dust laden air as it enters said chamber, a series of separating flanges of gradually increasing angularity from which the dust laden air is impelled, and means for adjusting the flanges relative to each other.

6. A dust separator comprising a separating chamber having a plurality of discharge pipes located one within the other, and means for independently adjusting said discharge pipes relative to the entrant portion of said separator.

7. A dust separator comprising a separating chamber and a plurality of discharge pipes, one of which is provided with a flange which composes practically one wall of said separating chamber, means for adjusting said pipe for regulating the size of said chamber, the other discharge pipe being located within the discharge pipe last mentioned, there being means for adjusting the second discharge pipe independently of the first.

In testimony whereof I hereunto affix my signature in the presence of two witnesses, this 26th day of January, 1916.

MILTON F. WILLIAMS.

Witnesses:
M. A. KINCER,
WM. WEBER.